United States Patent [19]

Stodolski

[11] 4,145,684

[45] * Mar. 20, 1979

[54] ALERTING SYSTEM WITH DUAL-ADDRESS MEMORY

[75] Inventor: Thomas R. Stodolski, Cambridge, Mass.

[73] Assignee: Bell & Howell Company, Chicago, Ill.

[ * ] Notice: The portion of the term of this patent subsequent to Mar. 1, 1994, has been disclaimed.

[21] Appl. No.: 690,854

[22] Filed: May 28, 1976

[51] Int. Cl.[2] .......... H04M 11/02

[52] U.S. Cl. .......... 340/311; 325/64; 325/466; 340/164 R; 340/171 A

[58] Field of Search .......... 340/311, 312, 164 R, 340/171 PF, 173 AM, 322, 32; 325/55, 64, 466; 179/41 A; 365/230, 49

[56] References Cited

U.S. PATENT DOCUMENTS

| | | | |
|---|---|---|---|
| 2,968,802 | 1/1961 | Flory et al. | 340/32 |
| 3,513,399 | 5/1970 | Wycoff | 325/466 |
| 3,694,579 | 9/1972 | McMurray | 179/41 A |
| 3,742,481 | 6/1973 | Nickerson | 340/311 |
| 3,889,252 | 6/1975 | Cox et al. | 325/64 |
| 4,010,460 | 3/1977 | De Rosa | 340/311 |
| 4,010,461 | 3/1977 | Stodolski | 340/311 |

*Primary Examiner*—John W. Caldwell, Sr.
*Assistant Examiner*—James J. Groody
*Attorney, Agent, or Firm*—Alfred H. Rosen

[57] ABSTRACT

A dual address paging receiver is described having page memory for automatically storing a page in the mode addressed if the user does not reset the receiver within a prescribed time interval after an alert signal is started. After a page is stored it can be recalled in the mode addressed from page memory by operating the reset button. The receiver provides two different kinds of alert signals depending upon the mode in which it is addressed. The alert generator is also operable in two different modes that are audibly distinguishable from each other for alternately indicating either power turn-on of the device or the receipt of a calling signal.

9 Claims, 3 Drawing Figures

ALERTING SYSTEM WITH DUAL-ADDRESS MEMORY

This application claims subject matter disclosed in applicant's prior copending application Ser. No. 541,873, filed Jan. 17, 1975, now U.S. Pat. No. 4,010,461, which has the same disclosure.

BACKGROUND OF THE INVENTION

This invention relates in general to multi-address alerting devices employed in a system for alerting one or some of a large number of persons from a central paging station. In practice, for example, a caller of such a person may reach the central station by telephone, and the paging station may signal to the person via a radio common carrier (RCC) link. The invention thus relates more particularly, by way of example, to personal paging devices which can be carried on the person of a user, for response to space-transmitted calling signals such as radio waves. Alert signals provided by such devices may be audible, visible or tactual (e.g.: vibratory), and alerting devices are known which give the user a choice of one or more alerting modes. Whatever alerting mode or modes are employed in a particular alerting device, the user must be wearing the alerting device, or at least be sufficiently close to it to perceive the alerting signal, in order for the alerting device to accomplish its purpose. This invention is addressed generally to situations in which a user of an alerting device which is energized to receive calling signals nevertheless fails for one reason or another to perceive an alerting signal that is provided by the device in response to a calling signal; and more particularly to the effective use in such situations of an alert device that has the capability of issuing an alerting signal in one of two or more different modes in response to a calling signal which is addressed to one only of the available modes.

In the art of paging persons by means of portable alerting devices, such as radio receivers carried on the person that are responsive to an assigned carrier frequency, it is known to modulate the carrier with a sequence of calling frequencies, or "tones", for the purpose of signalling to subscribers with unique combinations of tones, for example, to address a particular subscriber, or to broadcast a particular message. A known two-tone paging system uses two tones selected in a coded sequence from an array of available tones. In another system, five tones are sent out (i.e.: modulate the carrier) in a coded sequence, but the number of tones used in a given coded sequence is not critical. In any system, each individual receiver is responsive, through a tone-responsive network or the like, to a selected one or few of all the possible useful codes. In a five tone paging system which is in common use, each tone last 33 milliseconds, and there is a 35 millisecond gap between pages, resulting in $(5\times 33)+35=200$ milliseconds for a complete page. Such a 5-tone paging system allows five pages per second. Thus, an alerting device in such a system has one-fifth of a second to receive a calling or paging signal and to provide an alerting signal in response to it. The alerting signal can, however, have duration and form which are each independent of the duration and form, respectively, of the paging signal.

Paging systems are known which provide the user with two modes of alerting signal and means in the receiver automatically to select a particular mode in response to a particular tone-code modulation of the carrier. Such systems are sometimes known as "dual address" paging systems, and they add to the paging art the capability of addressing a choice of one of two possible messages to a particular subscriber.

Paging system receivers are known in which calling information is stored if not responded to within a specified time interval. An example is disclosed in the Application for U.S. Patent of James DeRosa, Ser. No. 532,059 filed Dec. 12, 1974, now U.S. Pat. No. 4,010,460, which is assigned to the same assignee as the present application. In alerting systems of the kind that is described by DeRosa, the receiver is provided with some means to terminate an alerting signal and to set the device in condition to respond to another paging or calling signal. In the described example, that means is a manually-operable switch labelled "reset"; and conveniently that switch is of the momentary-contact type. Upon perceiving an alert signal, the user operates the reset switch. If within a prescribed time interval after initiating an alert signal the alerting device does not receive from the user a signal (e.g.: operation of a reset switch) that the user has perceived the alert signal, the device itself automatically terminates the alert signal and stores in a page memory the information that a calling signal was received. This information is retained in the page-memory until the alerting device is de-energized (by being shut-off, or depletion of its power supply if a battery is used), or until the user operates the reset switch. Thereafter, if the reset switch is operated, the alerting device will again initiate an alert signal, and in that situation the reset switch functions additionally and alternatively as a recall switch. A second operation of this switch terminates the recalled alert signal and resets the receiver into condition for receiving another calling signal and providing an alert signal in response to it.

GENERAL NATURE OF THE INVENTION

The present invention provides a paging receiver having both page memory and dual-address capabilities that remembers which address was paged. The receiver incorporates a dual-address memory for conditioning a signal mode selector to drive an alert signal generator in a selected mode. The dual-address memory is set by one of two signals available from the tone-responsive decoder network and chosen by the modulation tone code on the incoming page or calling signal. Signals for driving the alert signal generator are provided within the receiver in response to any calling signal that will pass the decoder network. In addition the receiver can be made to provide on turn-on a unique alerting signal in a mode that is different from any of the modes selected in response to a calling signal.

DETAILED DESCRIPTION OF THE DRAWINGS

Figure 1:
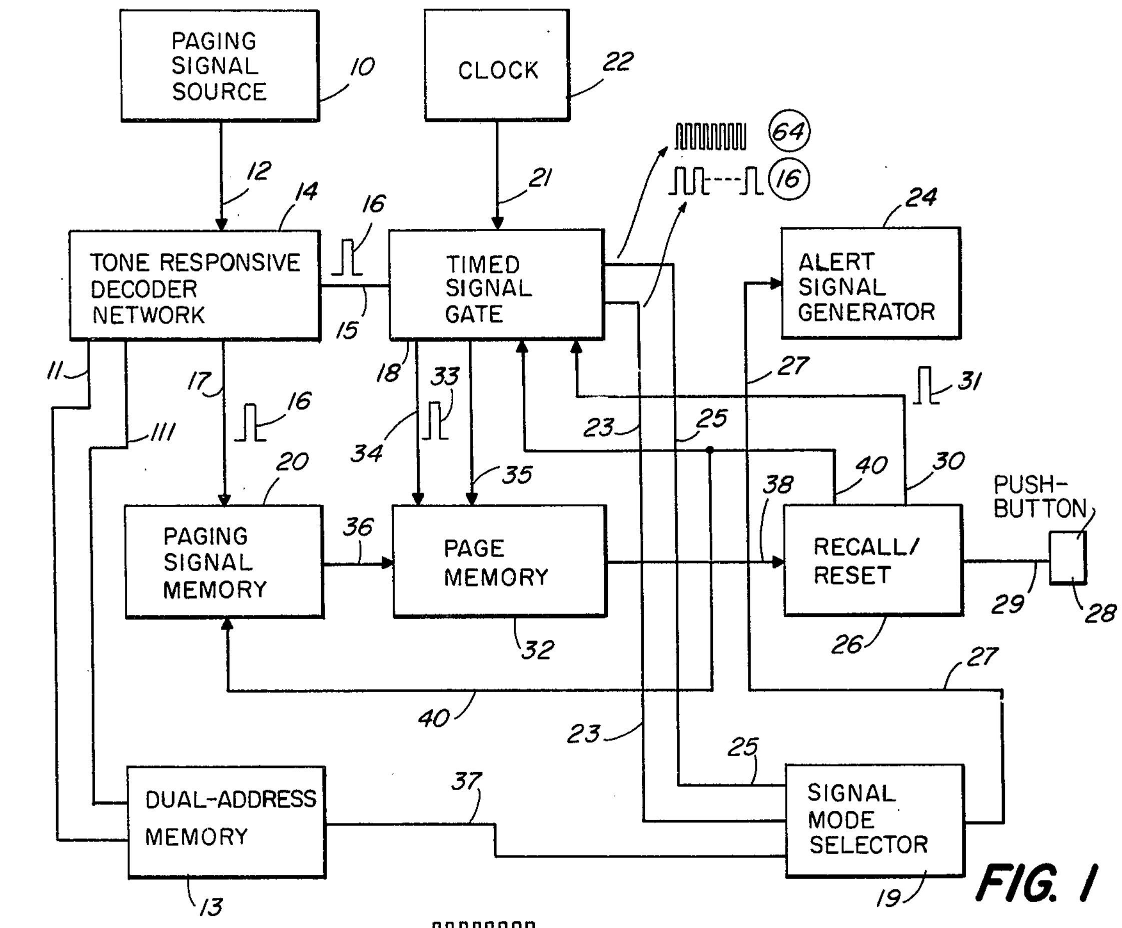
FIG. 1 is a block diagram of a page memory system.

A paging or calling signal source 10 may be an incorporated receiver of space-transmitted paging signals, or it may be a remote generator of paging signals. Paging or calling signals are supplied by this source to a tone-responsive decoder network 14 (which may be of any known form) over line 12. If the signals supplied are those to which the system is intended to respond, the network 14 supplies a signal pulse 16 over line 15 to a timed signal gate 18 and over line 17 to a paging signal memory 20, and a state changing signal to a dual-address memory 13 over line 11 or 111. Under control of a clock 22 via line 21 the gate 18 will activate an alert signal generator 24 for a prescribed interval of time. The output lines 23 and 25 from the gate 18 will each carry a different alerting signal, for example, a train of 16 pulses, or a train of 64 pulses, respectively, within that same prescribed time interval, one of which alerting signals will be applied to the alert signal generator 24 over line 27 via and as selected by the signal mode selector 19, which in turn is conditioned to make its selection by a signal supplied over line 37 from the dual-address memory 13. If within the prescribed time interval a user of the system perceives the alert signal and activates recall/reset components 26, for example, via line 29 by operating a momentary-contact switch through a push-button 28, the recall/reset components will provide a signal 31 over reset line 30 to the timed signal gate, to terminate operation of the alert signal generator. If on the other hand the reset button 28 is not operated within the prescribed time interval, the gate 18 will at the end of that interval terminate operation of the alert signal generator 24 and send a memory-alert signal 33 to the page memory components 32 over line 34. The paging signal memory 20, already containing the information that a paging or calling signal has been received, has set the page memory 32 into condition via line 36 to be set into a stored-page state and thereby provide a state changing signal to the recall/reset components 26 over line 38 in response to the memory-alert signal from line 34. The recall/reset components 26 are thus changed from the normal reset-function state to a state suitable for a recall function. If now a user operates the push-button 28, the recall/reset components will over recall line 40 initiate a cycle of operation of the timed signal gate 18 that is similar to the alerting signal mode which was initiated by the signal pulse 16 under control of the dual-address memory 13. Simultaneously, the paging signal memory 20 is reset via recall line 40. Shortly thereafter, as will be explained in greater detail below, the page memory 32 is reset via line 35 to a non-stored-page condition. This will restore the recall/reset components 26 to the normal reset-function state existing before receiving the state-changing signal. Upon perceiving the alert signal the user can now terminate it with the push-button 28, via reset line 30.

The Tone-Responsive Decoder Network 14 may incorporate the design of a multifrequency linear filter network as described in the application of the present inventor and another, Ser. No. 510,787 filed Sept. 30, 1974 which is assigned to the same assignee as the present application. As used in the present invention, such a network will desirably have the capability to respond to a code consisting of six tones, the first five being paging or calling tones which occupy in the aggregate a time interval of 165 milliseconds, and the sixth of which occurs in the 35 millisecond interval heretofore reserved as a gap between pages, and is used as a dual-address tone. Lines 11 and 111 are both normally "high". Address selection is made with a negative-going pulse 112 that is supplied to one of them by the tone-responsive network 14, depending on the presence or absence of the sixth tone. It is a usual property of multi-tone decoder networks to incorporate a system of logic for sequencing the network through a set of frequencies unique to the particular receiver. This logic system, as part of its function, will determine not only whether or not a page is received, but also whether or not a sixth tone exists with it. This information is fed to lines 11 and 111. If the sixth tone is absent, line 111 will have that pulse 112; if the sixth tone is present, line 11 will have that pulse; and thereby the dual-address memory 13 will be set in one or the other of its two possible states. This in turn sets line 37 either "high" or "low", to set the condition of the signal-mode selector 19.

The state of the dual-address memory 13 is not affected by operation of the push-button 28, as either a reset button or a recall button. Rather, the dual-address memory 13 remains in an existing state until a paging signal is received having a tone-code composition that can alter its state. Thus, when the page memory 32 is interrogated, by operating the push-button 28 as a recall means, the alert signal that is recalled will be in that mode which is determined by the then-existing state of the dual-address memory 13. In this way the present invention assures not only that a page is remembered, but also that the particular address that was paged is also remembered. As presently illustrated, a paging receiver that incorporates the invention and which has stored a paging signal will answer a memory interrogation with an alert signal in the form of a slow-rate beep or a high-rate beep, depending upon the address that was paged.

Figure 2:
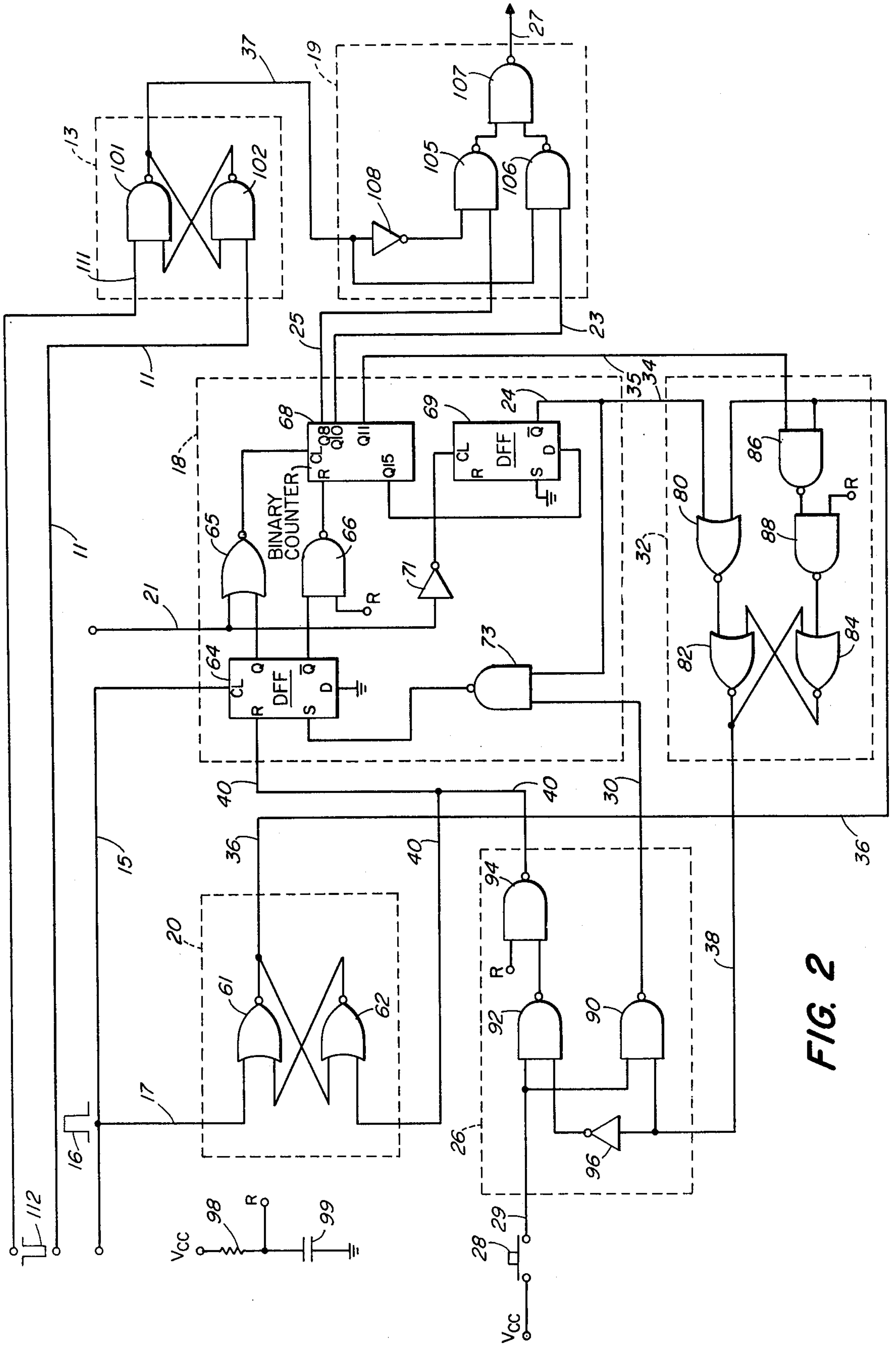
FIG. 2 illustrates logic circuitry that may be incorporated in blocks 13, 18, 19, 20, 26 and 32 of FIG. 1; and, FIG. 3 illustrates the logic circuitry of block 24 of FIG. 1.

In FIG. 2 the paging or calling signal memory 20 includes a static flip-flop comprised of two cross-coupled NOR gates 61 and 62. When a pulse 16 occurs line 36 goes low setting the page memory 32 in condition to be put in a stored-page state via line 34. The timed signal gate block 18 includes a D-type flip-flop (DFF) 64, a NOR gate 65, a NAND gate 66, a 15-stage binary counter 68, a second D-type flip-flop (DFF) 69, an inverter 71, and a second NAND gate 73, interconnected as shown. When pulse 16 occurs at terminal CL, the Q-output of the first DFF 64 goes low, allowing the clock signal on line 21 to be fed into the binary counter 68 via the first NOR gate 65. It is a known property of such binary counters to provide at various output terminals thereof voltage pulses at frequencies that are binary divisions of the clock frequency (i.e.: the clock frequency divided by 2, 4, 8, 16, etc.) In a complete cycle of operation, which lasts for a fixed predetermined interval of time, line 23 will have a train of 16 pulses from output Q10 on it, and line 25 will have a train of 64 pulses from output Q8 on it. Under control of the dual-address memory, one of the other of these outputs is applied to drive the alert signal generator 24. Since both trains occur in the same time interval, the 16-pulse train produces a "slow-rate" beep, and the 64-pulse train a "high-rate" beep, from the alert signal generator. At the end of the fixed time interval, the Q15 output of the counter 68 goes high driving the D terminal of the second DFF 69 also high. When the next clock pulse to the CL terminal of DFF 69 goes high, the $\overline{Q}$ output goes low and, via line 34 and the second NAND gate 73 causes the set termnal S of the first DFF 64 to go high. This causes the Q-output of DFF 64 to go high and the $\overline{Q}$ output to go low, in turn cutting off the clock to the binary counter 68 and resetting all Q-states of the binary counter to low by feeding the $\overline{Q}$ low signal to the reset terminal R via the first NAND gate 66.

At the same time the low signal on line 34 is fed into the page memory 32, which contains a NOR gate 80, a pair of NOR gates 82, 84 cross-coupled, and first and second NAND gates 86, 88, respectively. When line 34 goes low simultaneously with line 36 being low, the page memory 32 is set into a stored-page state. If line 36 is high, a low signal on line 34 will not set the page memory into a stored-page state. Page memory is thusly set through decision of NOR gate 80, which sends a high signal to the cross-coupled NOR gates 82, 84. Line 38 goes low, thereby indicating a stored page to the recall/reset mechanism 26, which contains three NAND gates 90 92, 94 and an inverter 96. To recall a stored page from the memory 32, the push-button 28 is pressed causing line 29 to go high. This high signal is applied to NAND gates 90 and 92 in shunt. If line 38 is then low, the decision process of the NAND gates 92, 94 will cause line 40 to go high, which in turn sets the Q-output of the first DFF 64 low, and that event starts the alert sequence of the binary counter 68. At the same time, the high signal on line 40 is fed into the paging or calling signal memory 20, causing line 36 to go high. The timed signal gate 18 is now going through its cycle, operating the alert signal generator 24, with the added operation of resetting the page memory 32 to a non-stored-page condition via line 35 in conjunction with the high signal on line 36. Line 35, which is connected to output Q11 of the binary counter 68, will go high after Q10 has gone high and gone low once, that is after the first of 16 cycles of the 16-pulse train that appears at output Q10 of the counter; this insures at least one pulse of alert signal at the slow rate from the generator 24 before the page memory 32 is reset, or four pulses at the high rate, depending on the then-existing state of the dual-address memory 13.

The dual-address memory contains two cross-coupled NAND gates 101 and 102, with lines 11 and 111 being applied, respectively, to an input of each.

When the sixth tone is absent from a paging or calling signal, line 111 will have the negative-going pulse 112, and line 37 will go "high". Conversely, when the sixth tone is present, the negative-going pulse 112 will be on line 11, and line 37 will be "low".

The signal mode selector 19 is essentially a switch including three NAND gates 105, 106 and 107, and an inverter 108. When line 37 is "high" the decision process of the NAND gates will be such that the train of 16 pulses in line 23 will be fed through to line 27. When line 37 is "low", the decision process will cause the train of 64 pulses on line 25 to be fed through to line 27.

The decision process of NAND gates 86, 88 in the page memory 32 with lines 35 and 36 both "high" will switch line 38 to a "high" state. This sets the recall-reset mechanism 26 into a reset condition to enable manual termination of an alert signal via the push-button 28. When lines 38 and 29 are both "high" simultaneously, the decision process of NAND gate 90 will cause line 30 to go "low", and via NAND gate 73 this applies a "high" signal to the set terminal S of the first DFF 64, to terminate the alerting sequence of the timed signal gate 18. Simultaneously, line 40 remains "low" and has no effect on DFF 64.

Vcc is the (+) operating voltage applied via resistor 98 and capacitor 99 to terminal R. This initiates the states of the various flip-flops in the circuit, such that an alerting sequence will occur on turn-on of the system, to indicate that the system is functioning. The system can be reset manually via push-button 28, or this turn-on alert signal will continue to the end of cycle of the timed signal gate 18, without storing a page in the memory 32, for the reason that the turn-on event does not supply a signal pulse 16 to the paging signal memory 20.

Figure 3:
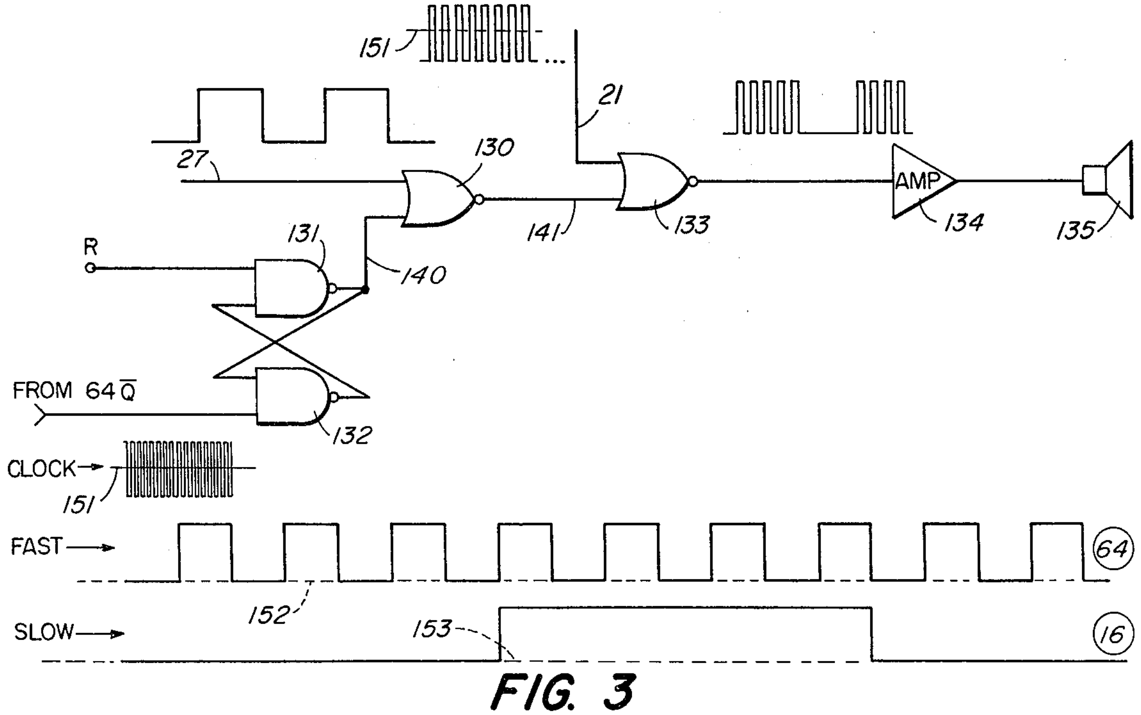

FIG. 3, showing a representative circuit for the alert signal generator 24, includes first and second NOR gates 130 and 133, a pair of NAND gates 131,132 cross-coupled as a static flip-flop, an amplifier 134 and a loudspeaker 135, interconnected as shown. The alerting signal line 27 is connected to one input of the first NOR gate 130. The static flip-flop has terminal R connected to one input at NAND gate 131, and the other input at NAND gate 132 is connected to the $\overline{Q}$ output of the first DFF 64 in the timed signal gate 18. On turn-on, terminal R goes "low" and puts a "low" on the input to NAND gate 131, causing line 140 to go "high". When line 140 is "high" the decision process of the first NOR gate 130 causes line 141 to be "low"; and the decision process of the second NOR gate 133 causes the clock pulses on line 21 to be fed without interruption into the amplifier 134, which drives the loudspeaker 135. On manual reset via button 28, or upon automatic termination of the operating cycle of the timed signal gate 18, terminal $\overline{Q}$ of the first DFF 64 will go "low", all as is described above, and this will switch line 140 to a "low" state. The decision process of the first NOR gage 130 with the input at line 140 "low" will permit a signal on line 27 to appear inverted on line 141. That signal will be a 16- or 64-pulse-train, as is explained above. If line 27 is "low", (i.e.: no page signal) line 141 will be high, and the clock signal on line 21 will not appear at the amplifier 134. When an alerting signal appears on line 27, an interrupted CW signal from the clock 21 will be applied to the amplifier 134, the interruption rate being 16 or 64 pulses in the allotted time interval, as is evident from the waves shown at the bottom of FIG. 3, representing on base 151 the clock signal, on base 152 the fast-beep alerting signal and on base 153 the slow-beep alerting signal. In this manner, a turn-on signal is distinguished from a paging signal. An advantage is that a battery interruption in the absence of a received calling signal will be perceived as a turn-on, and not as a false paging signal.

I claim:

1. In an electrically-operated alerting device that is responsive to a received calling signal to initiate an input signal for an alert generator, which device also includes means for supplying electrical energy to the device, an alert generator for providing alternatively a signal indicating the application of said energy to said device or an alert signal to a user in response to said input signal, said alert generator comprising: alert signal output means; means to apply to said alert generator an energizing signal resulting from the application of power to said device immediately on application of power; means to apply said input signal to said alert generator; means to set said alert generator alternatively in a first state for a prescribed time interval in which it can report during only that time interval an application of power to said device or in a second state in which it can report a received calling signal event, means responsive to said energizing signal when said alert generator is in said first state to drive said output means in a first mode which audibly indicates the application of power to said device; and means responsive to said input signal when said generator is in said second state to drive said output means in a second mode audibly distinguishable from the first mode and which indicates a received calling signal.

2. An alerting device according to claim 1 including clock means for supplying a continuous clock-frequency wave, means responsive to said continuous wave to generate a pulse train at a frequency that is a sub-harmonic of said clock-frequency, means responsive to said energizing signal to drive said alert generator exclusively with said continuous wave for indicating said application of power, and means responsive to said input signal to drive said alert generator with said pulse train for indicating said calling signal.

3. An alerting device according to claim 2 wherein said means responsive to said input signal is arranged to drive said alert generator with both said continuous wave and said pulse train, whereby to indicate said calling signal with said continuous wave interrupted by said pulse train.

4. An alerting device according to claim 1 wherein said alert generator has a first input for coupling to said energizing signal and a second input for coupling to said input signal, means responsive to the presence of said energizing signal on said first input to drive said alert generator in the mode which indicates a application of power, and means responsive to the presence of said input signal on said second input to drive said alert generator in the mode which indicates a calling signal.

5. An alerting device according to claim 2 wherein said alert generator includes a loudspeaker, and said continuous wave and said pulse train are each applied to said loudspeaker.

6. An alerting device according to claim 1 including means responsive to a calling signal having address information to initiate an input signal having said address information, and means responsive to said input signal to drive said alert generator in a calling signal mode which includes address information.

7. An alerting device according to claim 6 including memory means for storing an input signal containing address information, and means to recall a stored signal for driving said alert generator in a calling signal mode which contains said address information, said energizing signal being applied to said alert generator but not to said memory means, whereby to distinguish an application of power from a stored calling signal.

8. An alerting device according to claim 4 including means responsive to a calling signal having address information to initiate an input signal having said address information, and means to apply said input signal to said second input terminal for driving said alert generator in a calling signal mode which includes said address information.

9. An alerting device according to claim 8 including memory means for storing an input signal containing said address information, and means to recall a stored signal for driving said alert generator in said calling mode, said energizing signal being applied to said generator but not to said memory means, whereby to distinguish an application of power from a stored calling signal.

* * * * *